(12) United States Patent
Fowler et al.

(10) Patent No.: US 8,902,222 B2
(45) Date of Patent: Dec. 2, 2014

(54) THREE DIMENSIONAL CONTRIVER TOOL FOR MODELING WITH MULTI-TOUCH DEVICES

(75) Inventors: Gregory W. Fowler, Toronto (CA); Vincent Ma, Richmond Hill (CA); Hans-Frederick Brown, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 385 days.

(21) Appl. No.: 13/351,116

(22) Filed: Jan. 16, 2012

(65) Prior Publication Data
US 2013/0181972 A1    Jul. 18, 2013

(51) Int. Cl.
   *G06F 15/00*      (2006.01)
   *G06F 3/048*      (2013.01)

(52) U.S. Cl.
   CPC ....................... *G06F 3/048* (2013.01)
   USPC ........................... 345/419; 345/173

(58) Field of Classification Search
   CPC ...................................................... G06F 3/048
   USPC ................................................. 345/419, 173
   See application file for complete search history.

(56) References Cited

U.S. PATENT DOCUMENTS

| | | | |
|---|---|---|---|
| 5,490,241 A | 2/1996 | Mallgren et al. | |
| 6,057,845 A | 5/2000 | Dupouy | |
| 7,465,230 B2 * | 12/2008 | LeMay et al. | 463/32 |
| 7,489,306 B2 * | 2/2009 | Kolmykov-Zotov et al. | 345/173 |
| 7,696,998 B2 | 4/2010 | Bae | |
| 7,889,195 B2 | 2/2011 | Shih et al. | |
| 8,514,221 B2 | 8/2013 | King et al. | |
| 2004/0001060 A1 | 1/2004 | Stollnitz et al. | |
| 2005/0162402 A1 | 7/2005 | Watanachote | |
| 2005/0233799 A1 | 10/2005 | LeMay et al. | |
| 2006/0001650 A1 | 1/2006 | Robbins et al. | |
| 2006/0132460 A1 | 6/2006 | Kolmykov-Zotov et al. | |
| 2008/0036773 A1 | 2/2008 | Bae | |
| 2008/0165140 A1 | 7/2008 | Christie et al. | |
| 2008/0180410 A1 | 7/2008 | McCall et al. | |
| 2009/0021475 A1 | 1/2009 | Steinle et al. | |
| 2009/0199130 A1 | 8/2009 | Tsern et al. | |

(Continued)

FOREIGN PATENT DOCUMENTS

WO       2010/056427       5/2010

OTHER PUBLICATIONS

Amazon Simple Queue Service, downloaded from Wikipedia, the free encyclopedia on Aug. 11, 2010. URL: http://en.wikipedia.org/wiki/Amazon_Simple_Queue_Service.

(Continued)

*Primary Examiner* — Phu K Nguyen
(74) *Attorney, Agent, or Firm* — Gates & Cooper LLP

(57) ABSTRACT

A method, apparatus, article of manufacture, and computer readable storage medium provides the ability to perform a three-dimensional (3D) modeling operation. A modeling tool is activated in a 3D modeling application. A visual representation (having three separate regions) of a grid system tool is displayed on a digital modeling canvas of the 3D modeling application. The grid system controls whether a gesture is captured as a modeling operation or a navigation operation. A starting touch event (of the gesture) is received in/on one of the three separate regions. The region where the starting touch event is received determines the operation that is to be performed/selected. The operation may be a 3D geometry creation operation, a restroking operation, or a navigation operation.

24 Claims, 9 Drawing Sheets

(56) References Cited

U.S. PATENT DOCUMENTS

| | | |
|---|---|---|
| 2010/0001962 A1 | 1/2010 | Doray et al. |
| 2010/0083111 A1 | 4/2010 | de los Reyes |
| 2010/0149211 A1 | 6/2010 | Tossing et al. |
| 2010/0295796 A1 | 11/2010 | Roberts et al. |
| 2011/0102464 A1 | 5/2011 | Godavari |
| 2011/0164029 A1 | 7/2011 | King et al. |
| 2011/0175821 A1 | 7/2011 | King |
| 2011/0209098 A1 | 8/2011 | Hinckley et al. |
| 2011/0296353 A1 | 12/2011 | Ahmed et al. |
| 2012/0210261 A1 | 8/2012 | Sarnoff et al. |
| 2013/0127910 A1 | 5/2013 | Tijssen et al. |

OTHER PUBLICATIONS

Nasri et al., "Taxonomy of interpolation constraints on recursive subdivision curves", The Visual Computer, 2002.

"CV Curve", http://www/kxcad.net/autodesk/3ds_max/Autodesk_3ds_Max_9_Reference_CV_Curve.html, Jul. 3, 2011.

International Search Report for Pot Application No. PCT/US2012/046540 filed on Jul. 12, 2012.

Blanke et al., "TOM A Multi-touch System for Learning Math", http://www.fh-trier.de/fileadmin/groups/12/Personen/Professoren/Schneider/papers/TOMCameraReady.pdf, May 2011.

Jakulin et al., "Artificial Aesthetic Sense", http://www.stat.columbia.edu/~jakulin/ASSAI/, Jun. 25, 2010.

Kammer et al., "Towards a Formalization of Multi-touch Gestures", http://www.dfki.de/its2010/papers/pdf/fp198.pdf, Nov. 2010.

Schoning et al., "Using Mobile Phones to Spontaneously Authenticate and Interact with Multi-Touch Surfaces", http://www.mmi.ifi.lmu.de/pubdb/publications/pub/schoening2008PhoneFlash/schoening2008PhoneFlash.pdf, 2008.

International Search Report for PCT Application No. PCT/US2012/021442 filed on Jan. 16, 2012.

International Search Report for PCT Application No. PCT/US2012/021446 filed on Jan. 16, 2012.

International Search Report for PCT Application No. PCT/US2012/021448 filed on Jan. 16, 2012.

Abbas, A.M., "A Subdivision Surface Interpolating Arbitrarily-Intersecting Network of Curves under Minimal Constraints", Computer Graphics International, Jun. 8-11, 2010, Singapore, SP11.

Biermann, H., "Sharp Features on Multiresolution Subdivision Surfaces", Proceedings Ninth Pacific Conference on Computer Graphics and Applications, Pacific Graphics, Oct. 16-18, 2001, pp. 140-149.

Levin, A., "Interpolating Nets of Curves by Smooth Subdivision Surfaces", Proceedings of SIGGRAPH 99, Computer Graphics Proceedings, Annual Conference Series, pp. 57-64, 1999.

Nasri, A., "Sketch-Based Subdivision Models", Eurographics Symposium on Sketch-Based Interfaces and Modeling—SBIM '09, vol. 1, p. 53, New York, New York, USA, 2009, ACM Press.

Schaefer, S., et al., "Lofting Curve Networks using Subdivision Surfaces", Eurographics Symposium on Geometry Processing (2004), pp. 103-114.

* cited by examiner

THREE DIMENSIONAL CONTRIVER TOOL
FOR MODELING WITH MULTI-TOUCH
DEVICES

CROSS-REFERENCE TO RELATED APPLICATIONS

This application is related to the following co-pending and commonly-assigned patent applications, which applications are incorporated by reference herein:

U.S. patent application Ser. No. 13/085,195 filed on Apr. 12, 2011, entitled "Transform Manipulator Control", by Gregory W. Fowler, Jason Bellenger, and Hans-Frederick Brown;

U.S. patent application Ser. No. 13/351,128 filed on the same date herewith, entitled "DYNAMIC CREATION AND MODELING OF SOLID MODELS", by Gregory W. Fowler, Jason Vincent Ma, and Hans-Frederick Brown; and U.S. patent application Ser. No. 13/351,133 filed on the same date herewith, entitled "GESTURES AND TOOLS FOR CREATING AND EDITING SOLID MODELS", by Gregory W. Fowler, Jason Vincent Ma, and Hans-Frederick Brown.

BACKGROUND OF THE INVENTION

1. Field of the Invention

The present invention relates generally to three-dimensional (3D) modeling, and in particular, to a method, apparatus, and article of manufacture for a 3D contriver tool that is used for dynamically creating, editing, and navigating a 3D model on a multi-touch device.

2. Description of the Related Art

Many 3D modeling and drawing applications are used in both desktop and multi-touch devices. However, none of the existing multi-touch 3D modeling or drawing applications provide a comprehensive 3D modeling system that take advantage of the multi-touch capabilities available across multiple mobile devices, without interfering with basic 3D navigation or requiring proficiency in the "art" of 3D modeling. To better understand the problems and deficiencies of the prior art, a description of prior art modeling applications and activities may be useful.

Some prior art modeling applications (e.g., the Spaceclaim Engineering™ application), have explored multi-touch interactions in the context of 3D modeling tasks. However, such prior art applications mimic the interaction available via a mouse pointer. These interactions are not tailored for laymen to use without 3D modeling experience. Many of the operations also require two hand interactions that may not be adequate for smaller devices and require more muscle memory.

In some cases, specific creation tools (e.g., extrude, revolve, offset, etc.) may have been implemented for multi-touch use. However, such creation tools are all static modality tools or commands that require proper selection. The tools are detached from the 3D navigation experience and do not fully take advantage of the multi touch input devices.

In view of the above, it may be understood that 3D modeling activities and tasks generally imply and require an understanding/mastering of concepts such as coordinate systems, tool operations, tool selection sequence, and validity of selections. Accordingly, what is needed is the capability to easily perform a variety of modeling operations (including creation, modification, and navigation) on a multi-touch input device without multiple steps or selection requirements.

SUMMARY OF THE INVENTION

Embodiments of the invention provide a 3D contriver tool that introduces new multi-touch gestures and interactions that combine multiple concepts into a simple, predictable workflow that mimics how brushes are used on an empty canvas. By simply touching a designated space, the user can rapidly create forms without having to worry about tool sequencing, profiles selection, direction, etc.

Additionally, once a form is laid down in space, the user can continue adjusting the form/geometry without having to launch an edit tool or invoke a special mode. By simply re-stroking the form, the system detects a modification operation and automatically switches to that operational mode.

Furthermore, embodiments of the invention introduce a "soft" 3D navigation (tumbling) activation/deactivation method that does not require the usage of multi-finger gestures or special modes. This transient navigation consists of tracking multi-touch inputs outside a virtual modeling box/plane that provides a 3D modeling environment that flows naturally without enforcing mode/tool switching or difficult clutch gestures to learn.

All of the above functionality is presented to the user as a single tool that is highly context sensitive. The tool exposes all of the above interactions without interfering with 3D Navigational activities (e.g., pan, zoom, tumble).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a multi-touch 3D modeling system that is based on the idea of using life-like drawing tools on a blank canvas. A single tool provides the ability to automatically control creating, positioning, editing, scaling, and posing based on the view direction and multi-touch events. All of these operations are provided within the same context and without exiting the tool for 3D navigation operations.

Accordingly, a user is provided with access to a number of modeling interactions (e.g., creating/editing) that create base geometry, that can be refined and later sculpted using 3D modeling tools. With the single tool (referred to herein as a 3D contriver tool), the user can explore new 3D creations without requiring special commands or modes. Such an approach maintains the artistic flow that users appreciate from prior art brushing and stroking systems.

Hardware Environment

Figure 1:
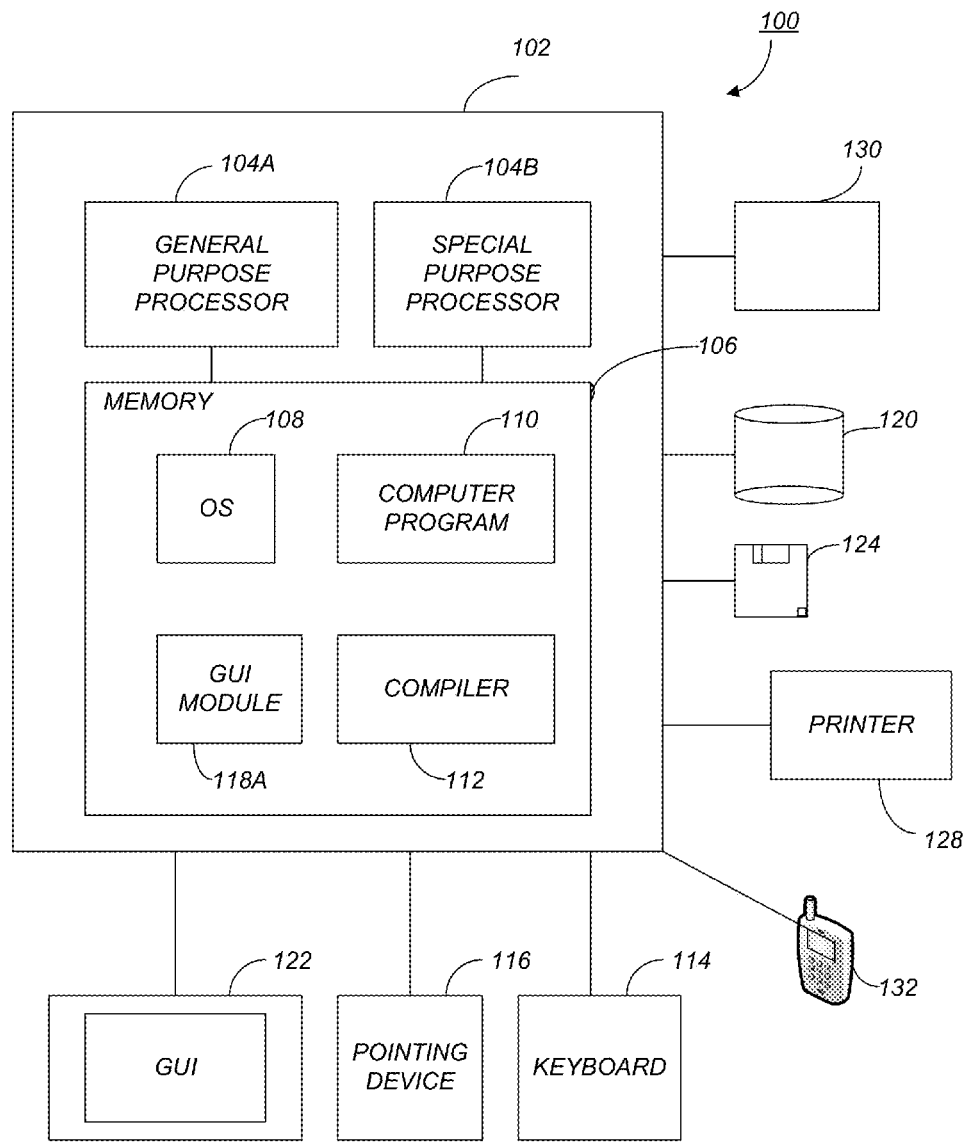
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to and/or integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
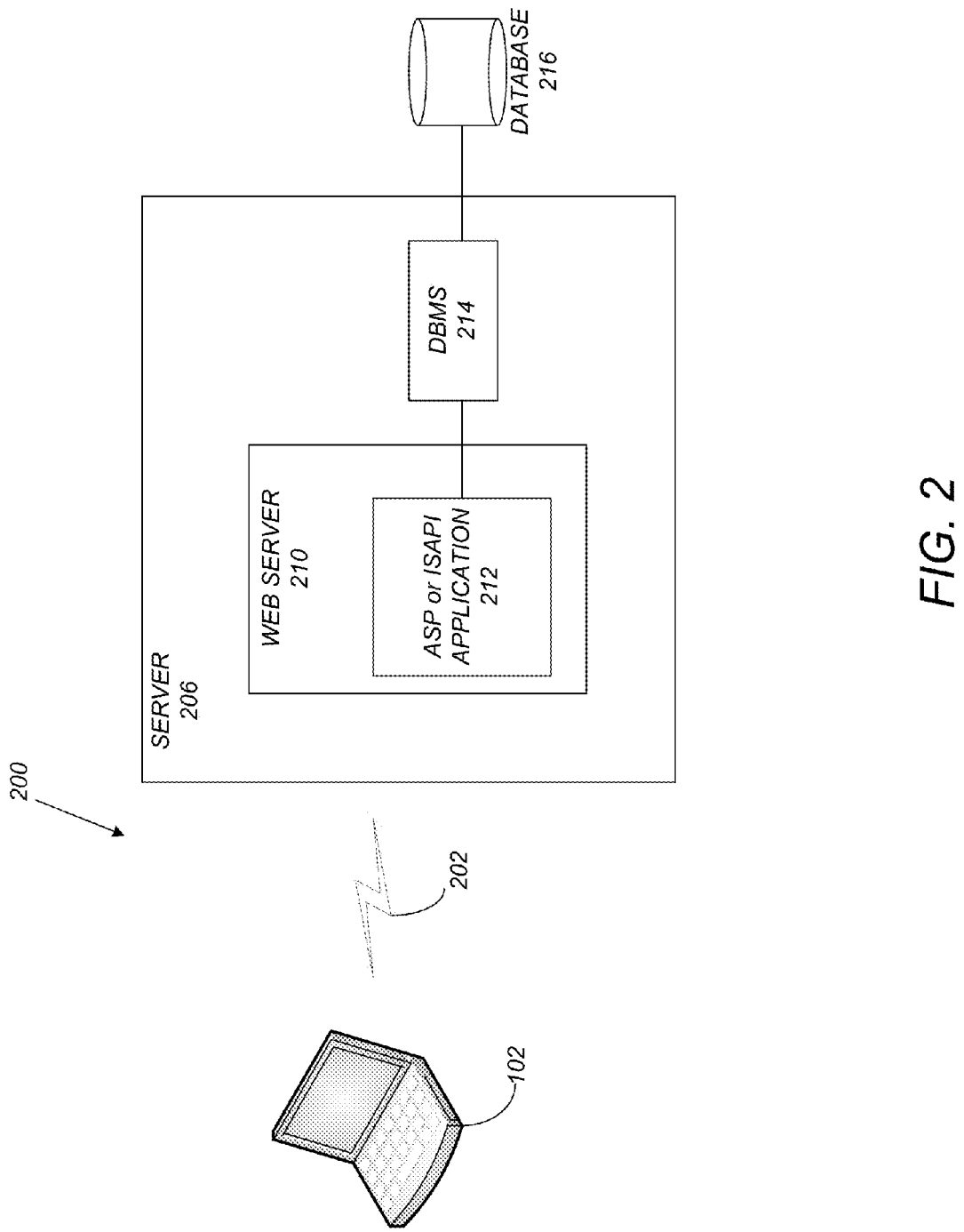
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102 and 206.

Software Embodiment Overview

Embodiments of the invention are implemented as a software application/3D contriver tool on a client 102 or server computer 206. Further, as described above, the client 102 or server computer 206 may comprise a thin client device or a portable device that has a multi-touch-based display.

The 3D contriver tool for multi-touch devices can be grouped in different clusters of functionality that are described in the present application and/or the related applications identified and cross referenced above) as follows:
1. Modeling Space and Tool Creator
   i) Modeling Box & Dominant Plane
   ii) Thumbing/Orbiting and Navigation
   iii) Empty Space Brush Modeling
   iv) Re-Stroking in Original Plane Interactions
   v) Re-Stroking in Different Plane Interactions
   vi) Two Finger Modeling
2. Modeling from a Face
   i) From Face Brush Modeling
   ii) Re-Stroking in Original Plane Interactions
   iii) Re-Stroking in Different Plane Interactions
   iv) Scaling
   v) Two Face Bridging
   vi) Bridging Re-Stroking
   vii) Mirroring Modeling Space and Tool Creator Embodiments of the invention (e.g., system) will provide a single tool that permits multiple modeling operations and navigation within the same context without requiring complex gestures or modes.

Modeling Box and Dominant Plane

Figure 3:
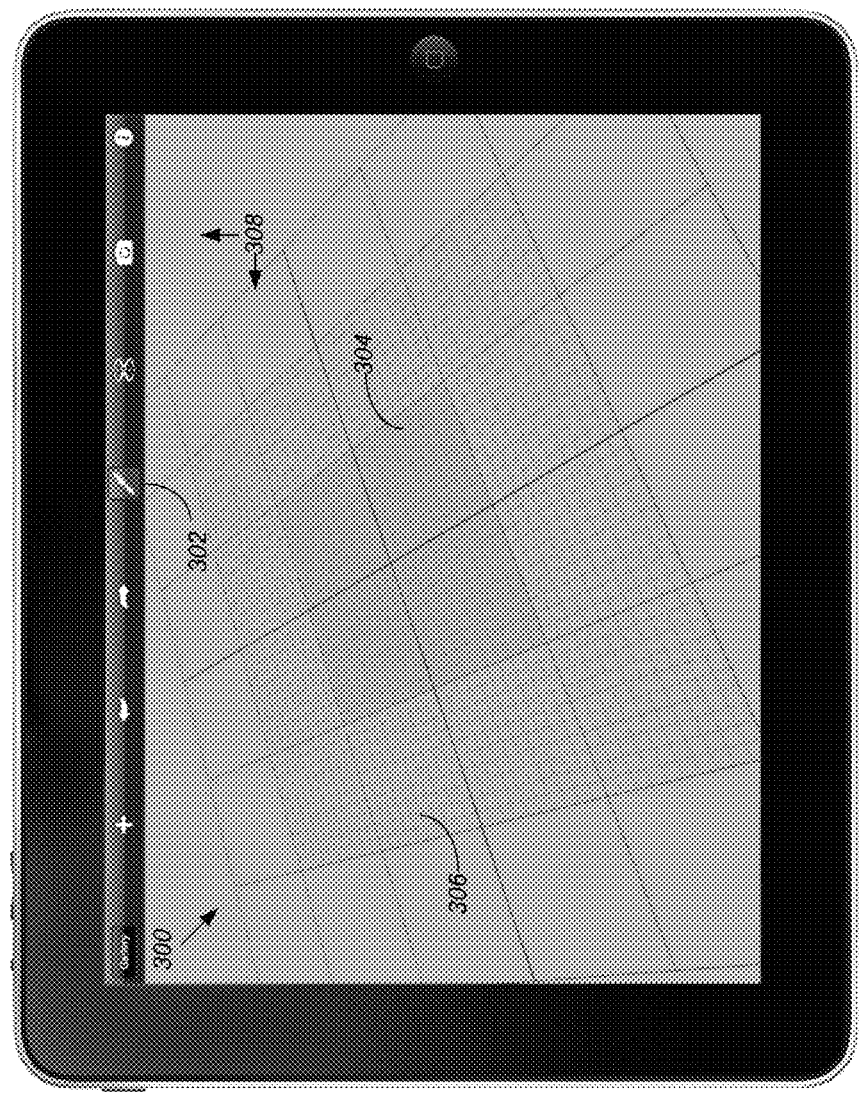
FIG. 3 illustrates a visual representation for a grid system (on a multi-touch device) that controls which gestures are either captured as modeling operations or navigational operations, specifically tumbling/orbiting in accordance with one or more embodiments of the invention.

FIG. 3 illustrates a visual representation for a grid system (on a multi-touch device) that controls which gestures are either captured as modeling operations or navigational operations, specifically tumbling/orbiting. In FIG. 3, the user has activated the modeling tool 302. Once the modeling tool 302 has been selected, the system displays a grid 300 composed of three specific regions.

The center region 304 represents an area that will generate geometry if a touch event is detected (see below for more detail regarding modeling operations).

The first outer region 306 represents an area that will either trigger a re-stocking operation (re-brushing the geometry after the initial creation) when a form is active or trigger a tumbling/orbit navigation if no form is active (see below for more details on re-stroking modeling operations).

The second outer region/fall-off grid 308 represents an area that will always trigger a tumbling/orbit navigation if a touch event is detected. Any other touch event detected outside of the fall-off grid 308 will also trigger tumbling/orbit navigation.

Embodiments of the invention perform the desired operation based on where the touch event commences and not where the gesture following the touch event proceeds. Thus, merely by commencing a touch event/gesture at a particular location with respect to the grid 300, a particular operation is performed. The FIGs. and description that follow illustrate examples of the different operations that may be performed based on the grid 300.

Tumbling/Orbiting and Navigation

Figure 4B:
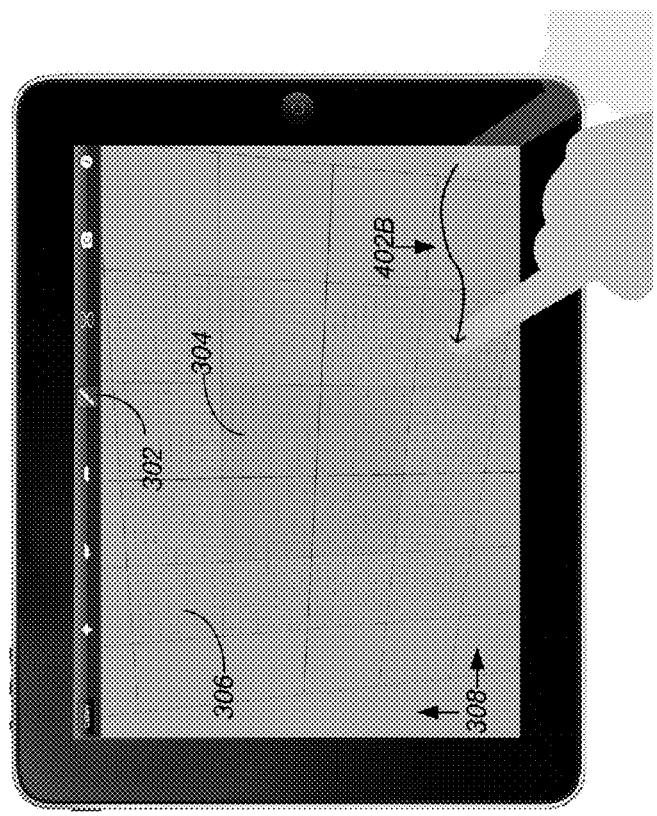
FIGS. 4A and 4B illustrate a tumbling/orbiting operation where a grid system adapts itself based on the viewing angle in accordance with one or more embodiments of the invention.
Figure 4A:
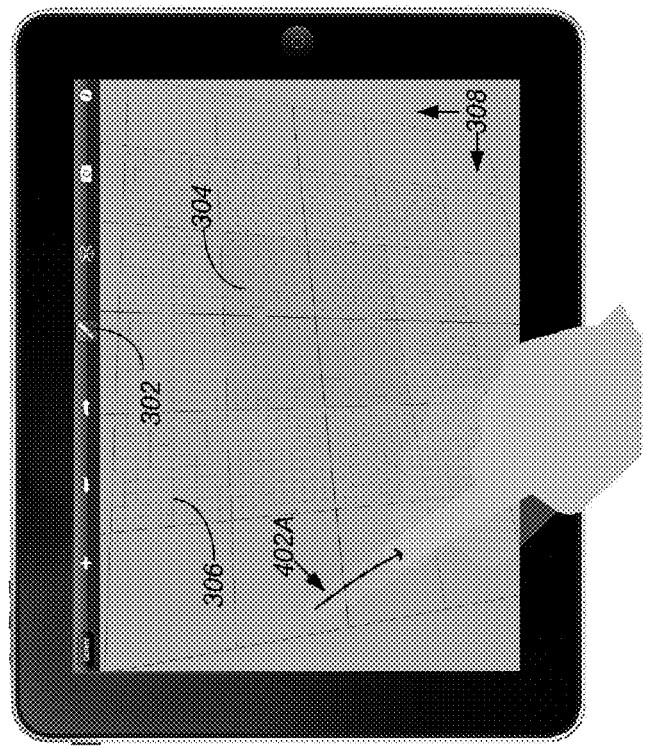

FIGS. 4A and 4B illustrate a tumbling/orbiting operation based on a touch event occurring in region 308 of the grid 300. FIGS. 4A and 4B further illustrate how the grid system adapts itself based on the viewing angle. The general idea is to always display the optimal grid representation, derived from the current viewing angle. Accordingly, depending on how the user is viewing the grid 300, the grid may be flipped and place the user in an optimal viewing position/angle. The current viewing angle may be determined as set forth in a dominant plane as described in co-pending patent application Ser. No. 13/085,195, which is incorporated by reference herein.

To respond to the user tumbling/orbiting in space, embodiments of the invention dynamically switch to one of the dominant planes: XY, XZ, YZ and update the graphical representation of the grid accordingly.

FIG. 4A shows the final state of the grid system while the modeling tool 302 is active. The captured gesture 402A occurs entirely outside of the grid 300 (i.e., in region 308), thus invoking a tumble/orbit. In other words, the captured gesture 402A begins and ends in area 308 and not within region 304 and/or 306. The resulting viewing angle determines that the XZ plane is dominant and all modeling operations in region 304 or any re-stroking operation in regions 304-306 will be projected to the XY plane.

FIG. 4B shows the final state of the grid system while the modeling tool 302 is active. The captured gesture 402B begins outside of the grid 300 (i.e., in region 308) thus invoking a tumble/orbit. In other words, the captured gesture begins outside of the grid system in region 308 but proceeds into region 306. The resulting viewing angle determines that the YZ plane is dominant and all modeling operations in region 304 or any re-stroking operation in regions 304-306 will be projected to the YZ plane.

In view of FIGS. 4A and 4B, it may be noted that embodiments of the invention evaluate the action that is to be executed based on where the touch event begins/commences rather than where the touch event proceeds or ends. Accordingly, in FIGS. 4A and 4B, since the touch event/gesture 402 begins in area 308, a navigation (e.g., tumbling/orbiting) operation is performed.

Empty Space Brush Modeling Interface

Figure 5:
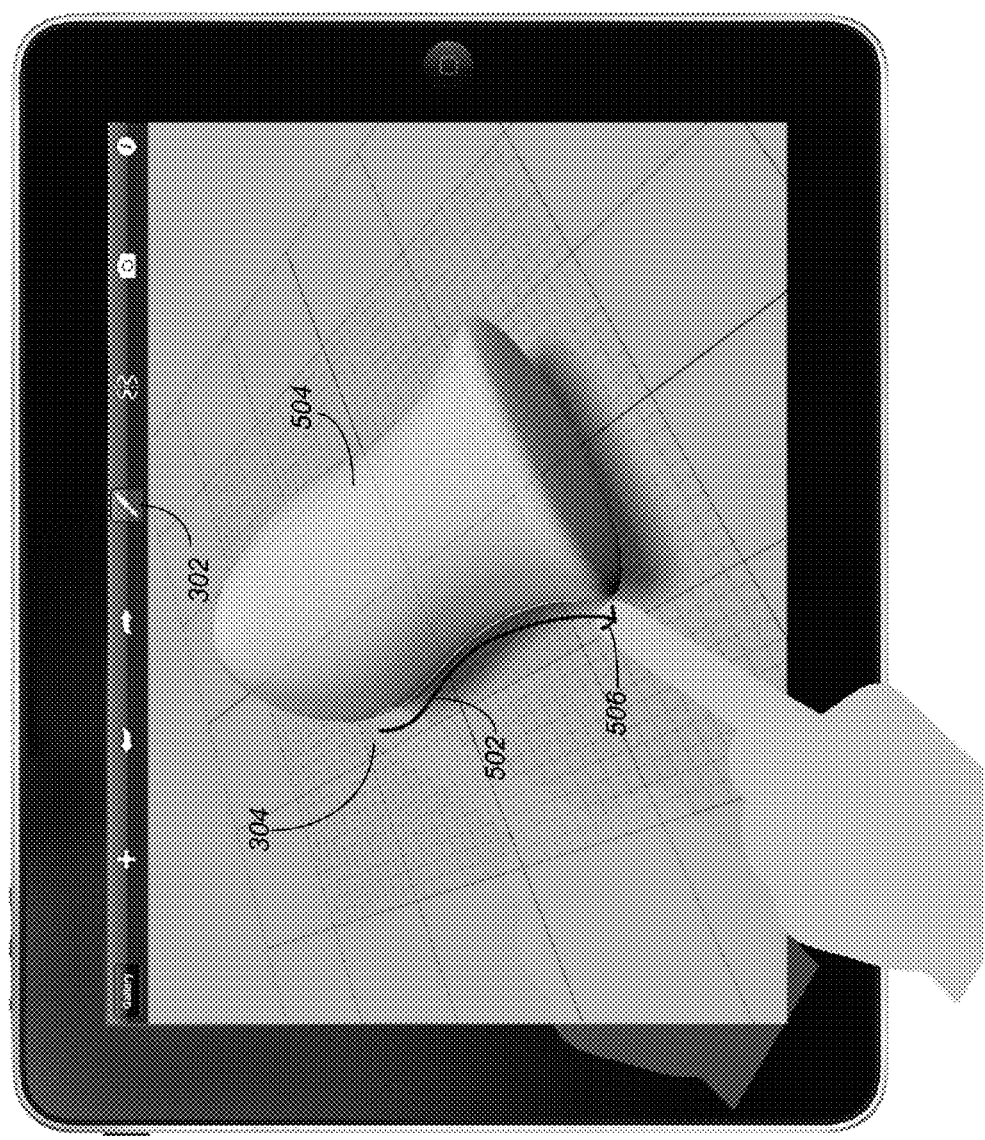
FIG. 5 illustrates an exemplary modeling operation that creates a 3D form based on a modeling operation performed on empty space from within a region in accordance with one or more embodiments of the invention.

FIG. 5 illustrates an exemplary modeling operation that creates a 3D form based on a modeling operation performed on empty space from within region 304. In FIG. 5, the user has activated the modeling tool 302, and the system displays an XY grid, determined by the current viewing angle.

The user starts brushing from a position inside the modeling grid 304. As the user drags a finger along any path 502, the system dynamically creates a 3D form 504. The form shaping is interactive and updates the form 504 every time it samples the gesture 502. Such form shaping is performed dynamically in real-time as the user performs the stroke/gesture. Accordingly, as the user is moving a finger, the model is changing. In the prior art, the ability to dynamically create a model in such a manner was not provided. Instead, prior art users were required to draw a curve, select the drawn curve, and select a profile. Thereafter, the user would perform a sweep/jigging operation/process. Such a sweep operation is not dynamically created as the user inputs a gesture but instead is based on an already drawn curve that is selected by the user.

Once the user finishes brushing (i.e., at 506), describing the path 502, the system finishes the shaping of the 3D form 504. The user can then tumble/orbit (e.g., as described above with respect to FIGS. 4A and 4B) or re-stroke the 3D form 504 (e.g., as described below).

Thus, since the gesture 502 commenced in region 304, a creation/modeling operation is performed based on the user's gesture 502. As illustrated, a 3D form 504 is dynamically created and conforms to the shape of the gesture/stroke 502. To perform the modeling creation operation, the user did not need to select a creation operation (e.g., from a menu or otherwise). Instead, the user simply began the gesture 502 within region 304. In response, a 3D form 504 is displayed on the grid 300 and is dynamically updated to conform to the stroke 506 while the stroke 506 is drawn. Again, since the gesture/stroke 502 began inside of region 304, it doesn't matter if the stroke 502 proceeds outside of region 304. Instead, what enables the modeling operation is where the stroke 502 commences.

Accordingly, the grid system 300 of the invention enables the user to perform a desired operation merely by beginning a gesture in a particular area/region of the grid system 300.

Re-Stroking in Original Plane Interactions

Figure 6A:
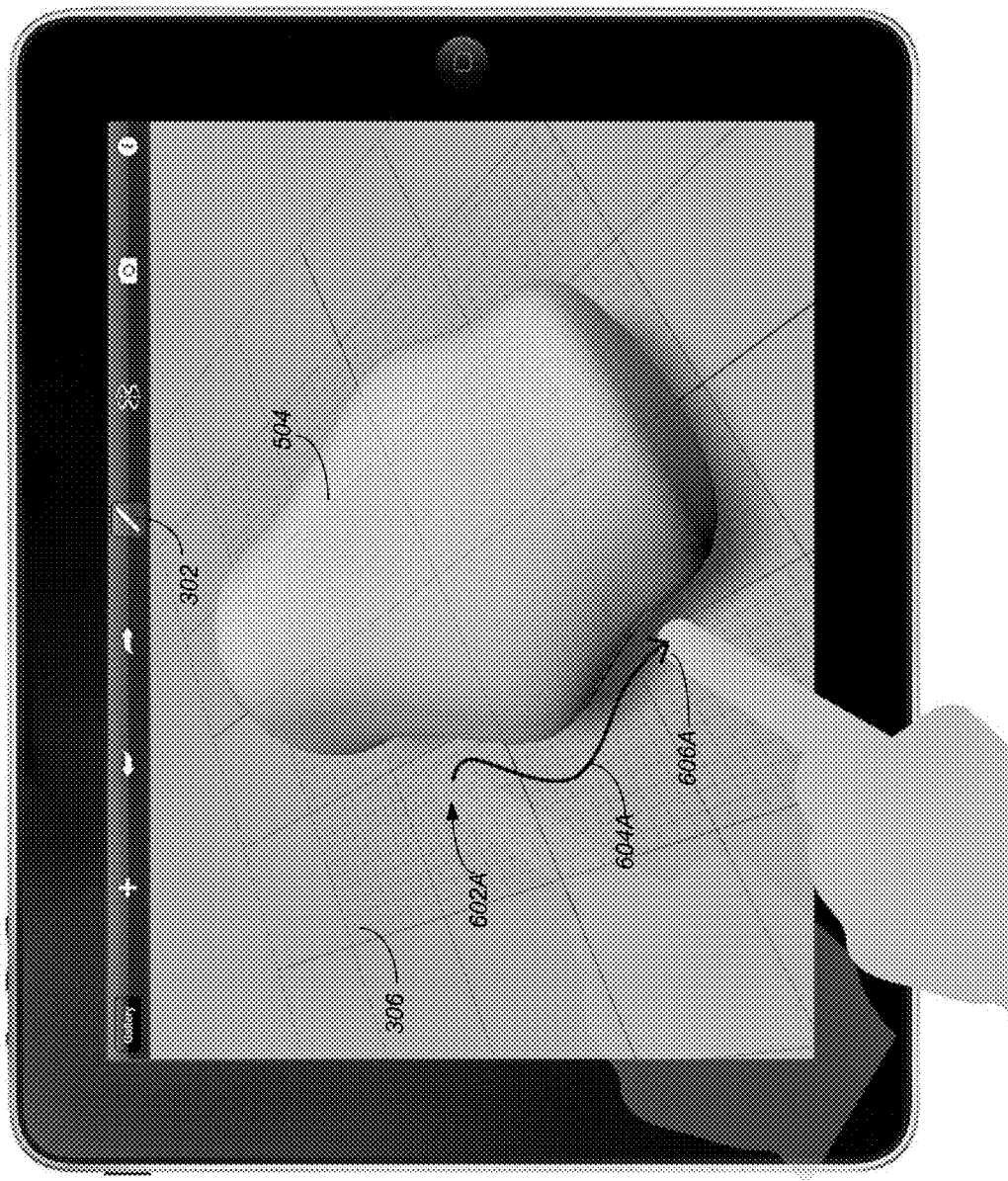
FIG. 6A illustrates an exemplary continued user interaction with the modeling tool and 3D form of FIG. 5(A) in accordance with one or more embodiments of the invention.

FIG. 6A illustrates an exemplary continued user interaction with the modeling tool 302 and 3D form of FIG. 5(A).

The user starts re-stroking from a position 602A inside the modeling grid 306. As the user drags his/her finger along any path 604A, the system dynamically reshapes the 3D form 504. The form 504 re-shaping is dynamic, interactive, and updates the form 504 every time it samples the gesture (i.e., dynamically in real-time).

In FIG. 6A, the re-stroking modifies the 3D form 504 in relationship to the current XY grid. Once the user finishes re-stroking (i.e., at 606A) thereby describing the path 604A, the system finishes re-shaping the 3D form 504 and the user can then either tumble/orbit or re-stroke the 3D form 504.

Accordingly, as described above, since the operation/gesture 504 is commenced at a location 602A within area/region 306, a restocking operation is performed (i.e., since form 504 is active). If the operation were conducted outside of region 306, (i.e., in region 308), an orbit/tumbling operation would be conducted.

Figure 6B:
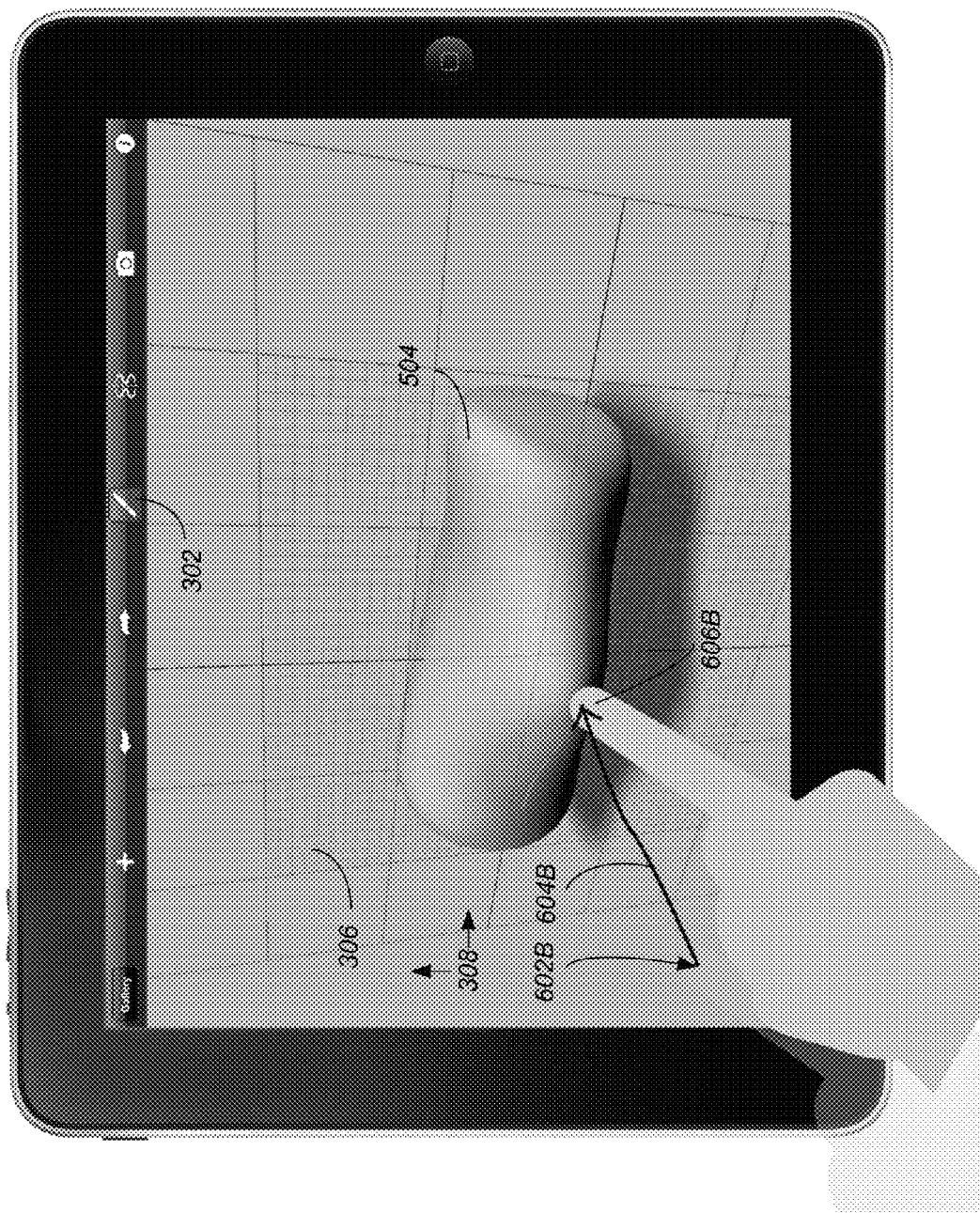
FIG. 6B illustrates an exemplary continued user interaction with the modeling tool and the model of FIG. 6A in accordance with one or more embodiments of the invention.

In FIG. 6B, the user continues interacting with the modeling tool 302 and the model of FIG. 6A. The image shows the final state of the grid system 300 while the modeling tool is active 302. The captured gesture 604B occurs/commences outside of the grid system 300 (i.e., in region 308) thus invoking a tumble/orbit. The resulting viewing angle determines that the YZ plane is dominant and all re-stroking operation will be projected to the YZ plane.

Re-Stroking in Different Plane Interactions

Figure 6C:
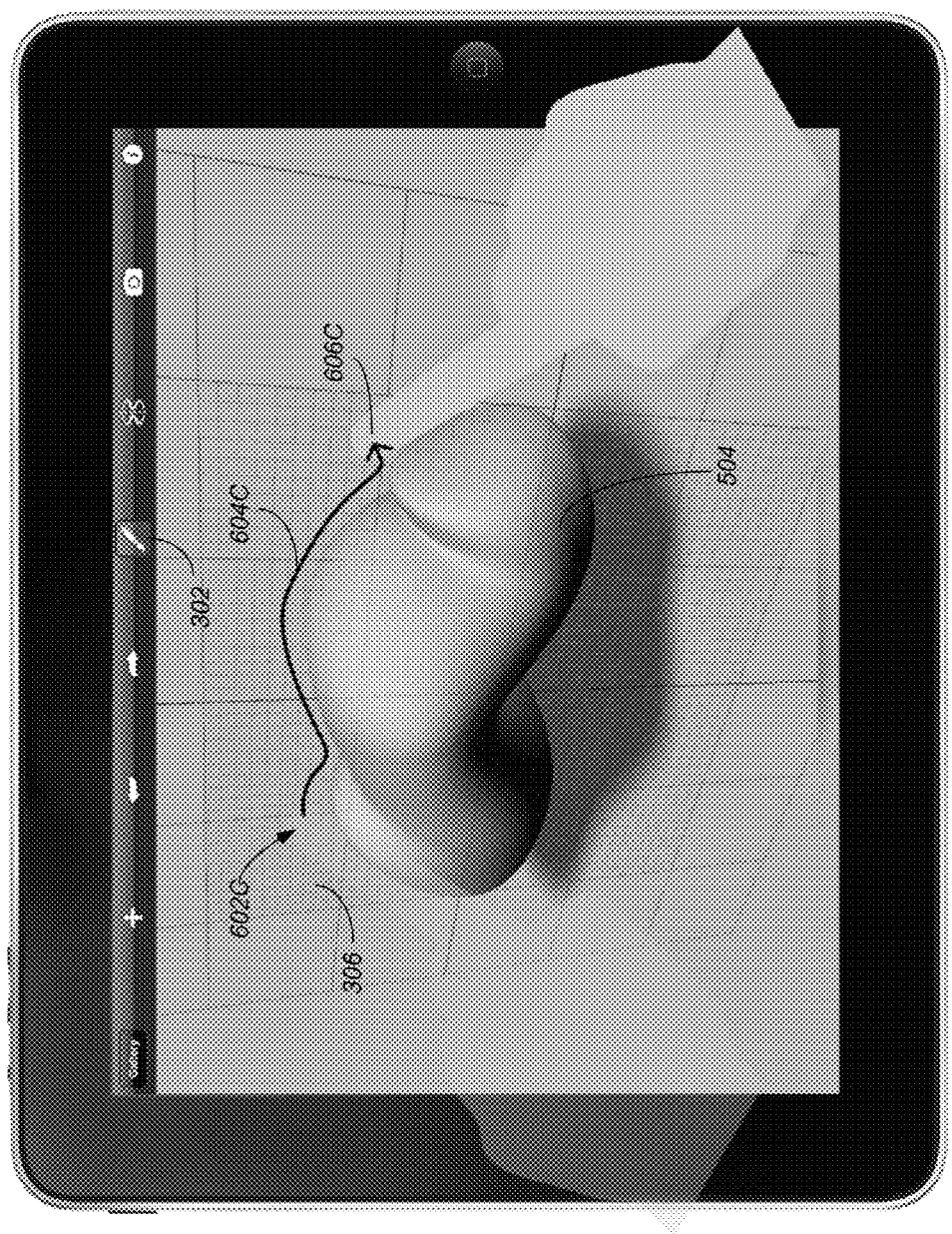
FIG. 6C illustrates an exemplary continued user interaction with a modeling tool and the model form of FIG. 6B in a different plane in accordance with one or more embodiments of the invention.

FIG. 6C illustrates an example of a user continuing to interact using a modeling tool 302 with the model form of FIG. 6B in a different plane. The user starts re-stroking from a position 602C inside the first outer grid 306. As the user drags a finger along any path 604C, the system dynamically re-shapes the 3D form 504. The form re-shaping is interactive, dynamic, and updates the form 504 every time the gesture 604C is sampled.

The re-stroking modifies the 3D form 504 in relationship to the current YZ grid. Once the user has finished the re-stroking gesture at point 606C describing the path 604C, the system finishes the re-shaping of the 3D form 504 and the user can then either tumble/orbit or re-stroke the 3D form 504.

Thus, as described above, since the stroke 604C begins at a point 602C within region 306, a reshaping operation is performed. Further, the operation is performed in the YZ plane due to the rotation/tumbling that was performed as described above with respect to FIG. 6B.

Logical Flow

Figure 7:
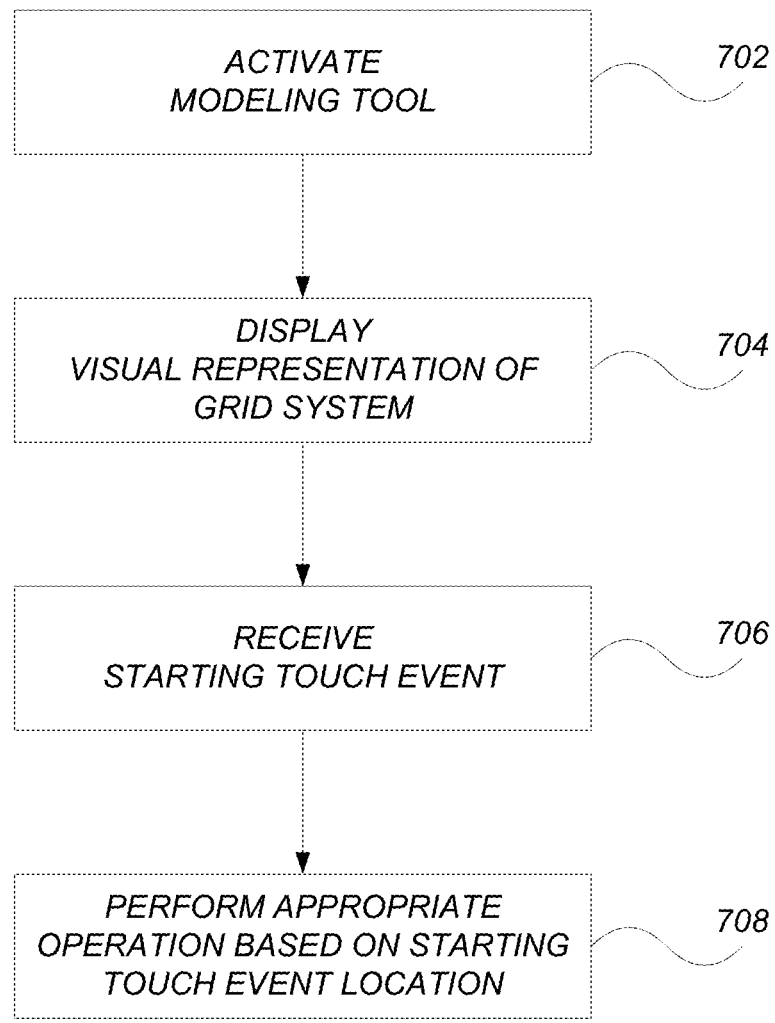
FIG. 7 is a flow chart illustrating the logical flow for performing three-dimensional (3D) modeling in accordance with one or more embodiments of the invention.

FIG. 7 is a flow chart illustrating the logical flow for performing three-dimensional (3D) modeling in accordance with one or more embodiments of the invention.

At step 702, a modeling tool is activated in a 3D modeling application that is executing on a computer (e.g., a multi-touch device).

At step 704, in response to the activation, a visual representation of a grid system tool is displayed on a digital modeling canvas. Such a grid system controls whether a gesture is captured as a modeling operation or as a navigation operation. The visual representation comprises three separate regions. Further, the grid system may be displayed on a blank canvas that does not contain any geometric objects.

The visual representation of the grid system tool may be a polygonal shaped grid (e.g., square, parallelogram, etc.) having three separate regions. The first region has one or more first cells that define a center region of the polygonal shaped grid. The second region of the grid has one or more second cells that surround and are visually distinguishable from the first region. The third region has one or more third cells that surround the second region and define a boundary of the polygonal shaped grid. Further, the third region is visually distinguishable from both the first and second areas. The regions may be visually distinguishable from each other based on a difference in densities between the cells (e.g., in the third region and second region), by color (e.g., blue for cells in the first region), or some other mechanism (e.g., highlighting, resolution, color of grid lines, shading of cells, etc.). The grid system tool as set forth herein can be seen throughout the figures, specifically FIGS. 3 and 4AB.

At step 706, a starting touch event, of the gesture, is received in one of the three separate regions.

At step 708, an operation (that is appropriate based on the starting touch event location) is performed. In this regard, if the starting touch event is in a first of the three separate regions, a 3D geometry/geometry form is created based on the gesture. If the starting touch event is in a second region, a restroking operation (if a 3D geometry is active) or a navigation operation (if no geometry is active) is performed. Lastly, if the starting touch event is in a third region (or outside of the visual representation of the grid system), a navigation operation (based on the gesture) is performed.

The navigation operation may modify a viewing angle of the digital modeling canvas. Based on such a viewing angle, a dominant plane can be determined. The grid system tool may then automatically and dynamically (i.e., in real time without additional user input) adapt itself and display consistent with the dominant plane. In other words, the visual representation of the grid system tool may re-orient or tumble to display at a different angle based on the rotation/tumbling performed by the user (via the gesture).

CONCLUSION

This concludes the description of the preferred embodiment of the invention. The following describes some alternative embodiments for accomplishing the present invention. For example, any type of computer, such as a multi-touch device, mainframe, minicomputer, or personal computer, or computer configuration, such as a timesharing mainframe, local area network, or standalone personal computer, could be used with the present invention.

In summary, embodiments of the invention provide a single tool that is displayed with different regions. The single tool provides the ability for the user to perform a variety of operations simply by beginning a touch event (or cursor click event) within a particular region. The tool may be used to navigate/tumble a 3D model, create a 3D geometric form (e.g., on a blank canvas or otherwise), and/or edit a an existing 3D geometric form. The operation selected/performed is based on where the touch event begins and not where the gesture associated with the touch event progresses. Nonetheless, once an operation is selected, the operation is based on the user's gesture.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for performing three-dimensional (3D) modeling comprising:
   (a) activating, in a 3D modeling application executing on a computer, a modeling tool;
   (b) displaying, in the 3D modeling application, a visual representation of a grid system tool on a digital modeling canvas, wherein:
      (i) the grid system tool controls whether a gesture is captured as a modeling operation or a navigation operation; and
      (ii) the visual representation comprises three separate regions;
   (c) receiving a starting touch event, of the gesture, on one of the three separate regions, wherein the separate region in which the starting touch event is received determines whether the gesture is captured as the modeling operation or the navigation operation without invoking a separate modeling or navigating tool;
   (d) if the starting touch event is in a first region of the three separate regions, the starting touch event triggers the modeling operation by creating a first 3D geometry based on the gesture;
   (e) if the starting touch event is in a second region of the three separate regions, the starting touch event triggers a restroking modeling operation if a second 3D geometry is active or triggers the navigation operation if the second 3D geometry is not active; and
   (f) if the starting touch event is in a third region of the three separate regions or outside of the visual representation of the grid system tool, the starting touch event triggers the navigation operation based on the gesture.

2. The method of claim 1, wherein the computer comprises a multi-touch device.

3. The method of claim 1, wherein the digital modeling canvas is displayed in response to the activating.

4. The method of claim 1, wherein the digital modeling canvas comprises a blank canvas that does not contain any geometric objects.

5. The method of claim 1, wherein:
   the navigation operation modifies a viewing angle of the digital modeling canvas;
   based on the viewing angle, a dominant plane is determined; and
   the grid system tool automatically and dynamically adapts itself and is displayed consistent with the dominant plane.

6. The method of claim 1, wherein:
   the visual representation of the grid system tool comprises a polygonal shaped grid having the three separate regions;

the first region of the grid system tool comprises one or more first cells defining a center region of the polygonal shaped grid;

the second region of the grid system tool comprises one or more second cells surrounding the first region, wherein the second region is visually distinguishable from the first region; and the third region comprises one or more third cells that surround the second region and define a boundary of the polygonal shaped grid, wherein the third region is visually distinguishable from the first region and from the second region.

7. The method of claim 6, wherein:
the third region is visually distinguishable from the second region based on a difference in densities between the one or more third cells in the third region and the one or more second cells in the second region.

8. The method of claim 6, wherein:
the first region is displayed in a different color from a color of the second region.

9. An apparatus for performing three-dimensional (3D) modeling in computer system comprising:
(a) a computer having a memory; and
(b) a 3D modeling application executing on the computer, wherein the 3D modeling application is configured to:
  (i) activate a modeling tool;
  (ii) display a visual representation of a grid system tool on a digital modeling canvas, wherein:
    (1) the grid system tool controls whether a gesture is captured as a modeling operation or a navigation operation; and
    (2) the visual representation comprises three separate regions;
  (iii) receive a starting touch event, of the gesture, on one of the three separate regions, wherein the separate region in which the starting touch event is received determines whether the gesture is captured as the modeling operation or the navigation operation without invoking a separate modeling or navigating tool;
  (iv) if the starting touch event is in a first region of the three separate regions, the starting touch event triggers the modeling operation and creates a first 3D geometry based on the gesture;
  (v) if the starting touch event is in a second region of the three separate regions, the starting touch event triggers a restroking modeling operation if a second 3D geometry is active or triggers the navigation operation if the second 3D geometry is not active; and
  (vi) if the starting touch event is in a third region of the three separate regions or outside of the visual representation of the grid system tool, the starting touch event triggers the navigation operation based on the gesture.

10. The apparatus of claim 9, wherein the computer comprises a multi-touch device.

11. The apparatus of claim 9, wherein the digital modeling canvas is displayed in response to the activating.

12. The apparatus of claim 9, wherein the digital modeling canvas comprises a blank canvas that does not contain any geometric objects.

13. The apparatus of claim 9, wherein:
the navigation operation modifies a viewing angle of the digital modeling canvas;
based on the viewing angle, a dominant plane is determined; and the grid system tool automatically and dynamically adapts itself and is displayed consistent with the dominant plane.

14. The apparatus of claim 9, wherein:
the visual representation of the grid system tool comprises a polygonal shaped grid having the three separate regions;

the first region of the grid system tool comprises one or more first cells defining a center region of the polygonal shaped grid;

the second region of the grid system tool comprises one or more second cells surrounding the first region, wherein the second region is visually distinguishable from the first region; and the third region comprises one or more third cells that surround the second region and define a boundary of the polygonal shaped grid, wherein the third region is visually distinguishable from the first region and from the second region.

15. The apparatus of claim 14, wherein:
the third region is visually distinguishable from the second region based on a difference in densities between the one or more third cells in the third region and the one or more second cells in the second region.

16. The apparatus of claim 14, wherein:
the first region is displayed in a different color from a color of the second region.

17. A non-transitory computer readable storage medium encoded with computer program instructions for a three-dimensional modeling application, which when accessed by a computer cause the computer to load the program instructions to a memory therein creating a special purpose data structure causing the computer to operate as a specially programmed computer, executing a method of performing three-dimensional (3D) modeling, comprising:
(a) activating, in the 3D modeling application in the specially programmed computer, a modeling tool;
(b) displaying, in the 3D modeling application in the specially programmed computer, a visual representation of a grid system tool on a digital modeling canvas, wherein:
  (i) the grid system tool controls whether a gesture is captured as a modeling operation or a navigation operation; and
  (ii) the visual representation comprises three separate regions;
(c) receiving, in the 3D modeling application in the specially programmed computer, a starting touch event, of the gesture, on one of the three separate regions, wherein the separate region in which the starting touch event is received determines whether the gesture is captured as the modeling operation or the navigation operation without invoking a separate modeling or navigating tool;
(d) if the starting touch event is in a first region of the three separate regions, the starting touch event triggers the modeling operation by creating, in the 3D modeling application in the specially programmed computer, a first 3D geometry based on the gesture;
(e) if the starting touch event is in a second region of the three separate regions, the starting touch event triggers, in the 3D modeling application in the specially programmed computer, a restroking modeling operation if a second 3D geometry is active or triggers the navigation operation if the second 3D geometry is not active; and if the starting touch event is in a third region of the three separate regions or outside of the visual representation of the grid system tool, the starting touch event triggers, in the 3D modeling application in the specially programmed computer, the navigation operation based on the gesture.

18. The computer readable storage medium of claim 17, wherein the computer comprises a multi-touch device.

19. The computer readable storage medium of claim 17, wherein the digital modeling canvas is displayed in response to the activating.

20. The computer readable storage medium of claim 17, wherein the digital modeling canvas comprises a blank canvas that does not contain any geometric objects.

21. The computer readable storage medium of claim 17, wherein:
the navigation operation modifies a viewing angle of the digital modeling canvas;
based on the viewing angle, a dominant plane is determined; and
the grid system tool automatically and dynamically adapts itself and is displayed consistent with the dominant plane.

22. The computer readable storage medium of claim 17, wherein:
the visual representation of the grid system tool comprises a polygonal shaped grid having the three separate regions;
the first region of the grid system tool comprises one or more first cells defining a center region of the polygonal shaped grid;
the second region of the grid system tool comprises one or more second cells surrounding the first region, wherein the second region is visually distinguishable from the first region; and
the third region comprises one or more third cells that surround the second region and define a boundary of the polygonal shaped grid, wherein the third region is visually distinguishable from the first region and from the second region.

23. The computer readable storage medium of claim 22, wherein:
the third region is visually distinguishable from the second region based on a difference in densities between the one or more third cells in the third region and the one or more second cells in the second region.

24. The computer readable storage medium of claim 22, wherein:
the first region is displayed in a different color from a color of the second region.

\* \* \* \* \*